United States Patent Office 3,034,225
Patented May 15, 1962

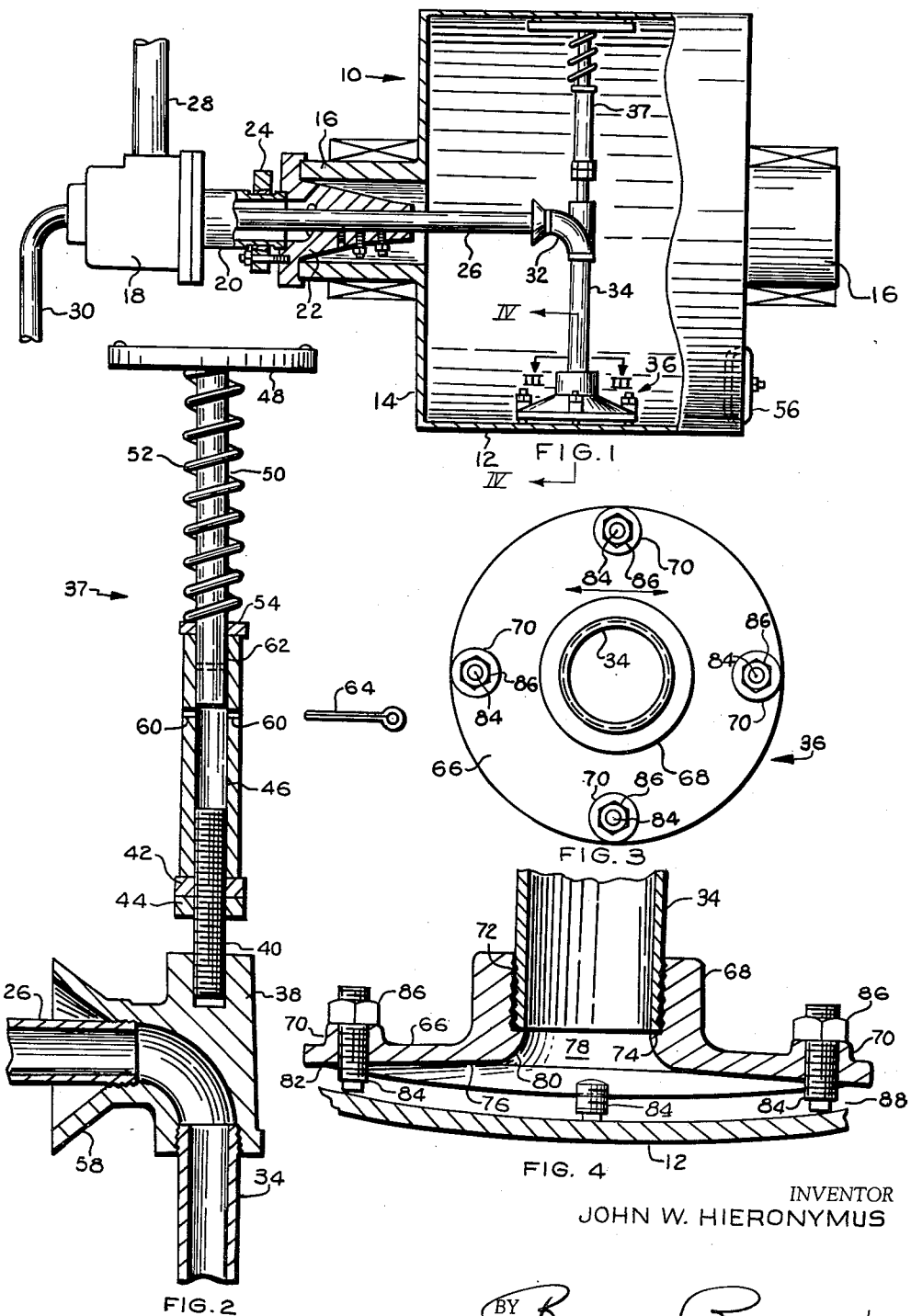

3,034,225
SYPHON PIPE STRUCTURE
John W. Hieronymus, Three Rivers, Mich., assignor to The Johnson Corporation, Three Rivers, Mich., a corporation of Michigan
Filed Nov. 5, 1958, Ser. No. 772,055
9 Claims. (Cl. 34—125)

The invention relates to syphon pipe structure for rotating steam heated drying drums and particularly relates to syphon pipes which are adapted to rotate with the drum.

Modern paper mill operation and similar industries using rotating dryer drums heated by steam have increased their output in recent years by increasing the velocity of the paper, or other article to be manufactured, passing through the mill. Among the problems created by such an increase in velocity is the effect the increasing dryer drum rotation speed has on the liquid condensate within the drum. At low rotative speeds the condensate forms as a puddle in the lower regions of the drum and can be removed by a stationary syphon pipe inserted in the condensate. At high rotative speeds the centrifugal force acting on the condensate forces the liquid to "rim" rather than form a puddle, e.g. form a continuous layer of condensate over the entire inner periphery of the drum, and requires a syphon pipe which rotates with the drum to prevent the layer of condensate from building up and materially reducing the rate of heat transfer from the steam within the drum to the drum shell.

As it is important that the condensate film during "rimming," wherein the condensate is evenly distributed over the entire inner drum surface by centrifugal force, as explained above, be maintained at a minimum thickness the construction and position of the syphon pipe pick-up shoe are important. For instance, due to the possibility of the drum axis being unlevel, the pick-up shoe should usually be centrally located intermediate the drum heads. The pick-up shoe inlet must be maintained in close proximity to the inner periphery of the drum and the syphon pipe structure must be adequately supported to withstand heavy strains and stress imposed on the syphon pipe, especially during starting of the drum rotation after they have been stationary for a time. Upon stoppage of the drums the steam within will condense and form a puddle, thus as the drum slowly picks up speed the condensate passes through a transition state wherein the condensate is in the form of a puddle at low rotative speeds, at higher speeds the condensate rides partially up the drum inner periphery and cascades toward the lower drum regions and finally at the operating velocity the condensate is fully distributed over the entire inner drum periphery. During the first two stages of condensate form, e.g. puddling and cascading, the condensate presents a resistance to the drum rotation and acts to impose a striking force on the syphon pipe as the syphon is rotated through the condensate. This striking of the syphon pipe and the condensate will occur many times before the "rimming" speed is achieved and will displace or damage the syphon if the syphon pipe structure is not adequately supported. It is thus one of the objects of the invention to provide means for supporting a syphon pipe within a dryer drum.

Another problem which occurs in removal of condensate from a dryer drum results from the pressure differential maintained between the interior of the drum and the pressure within the syphon pipe assembly. As the pressure within the pipe is necessarily lower than that of the drum the condensate will "flash" into steam upon entering into the syphon if the syphon encounters an abrupt void in the syphon. "Flashing" interferes with optimum performance of the condensate removal equipment and hence is to be avoided if possible. It is therefore another object of the invention to provide a syphon pipe pick-up shoe which minimizes "flashing" and which may be adjustably positioned in accordance with existing conditions.

Another object of the invention is to provide a syphon pipe brace which may be adjusted to vary the force holding the syphon pipe in position.

A further object of the invention is to provide a syphon pipe brace and pick-up shoe assembly which will maintain the shoe in proper engagement with the dryer drum shell, will be substantially dynamically balanced and may be assembled within dryer drums having hand holds.

Yet another object of the invention is to provide a pick-up shoe for a syphon pipe which is capable of receiving condensate from any direction on the drum inner periphery and which may be adjusted to regulate the intake area into the shoe.

These and other objects of the invention arising from the structural arrangements of the components of the invention and details thereof will become apparent from the following description and accompanying drawing wherein:

FIG. 1 is an elevational view, partly sectioned, of an assembled joint, spider, drum and syphon pipe assembly in accordance with the invention, FIG. 2 is an elevational sectional assembly view of the brace member and elbow, FIG. 3 is a plan view of the pick-up shoe taken along the line III—III of FIG. 1, and FIG. 4 is an elevational sectional view of the pick-up shoe taken along the line IV—IV of FIG. 3.

The syphon pipe structure of the instant invention is intended for use with conventional dryer drums and rotary steam joints and supporting structure now in common use and in FIG. 1 the conventional relationship of the components of a dryer drum are illustrated.

The dryer drum 10 is in the form of a cylinder having a peripheral shell 12 and end heads 14. Journals 16, one of which is hollow, are affixed to the heads and are supported in bearings whereby the drum may be rotated by power means, not shown. A rotary steam joint 18 is concentrically supported on the hollow journal 16 via a tubular conduit 20 maintained in a spider-flange 22 by a quick release flange 24. The spider-flange 22 includes a flange portion which is fixed to and encloses the open end of journal 16 and a spider portion within the journal. The horizontal syphon pipe portion 26 is also supported by the spider 22 and as the spider is affixed to the hollow journal the joint and other structure affixed to the spider-flange 22 will be substantially concentric to the dryer drum axis of rotation. A steam pipe 28 supplies the joint 18 and drum 10 with steam and the condensate is ultimately removed by the condensate drain pipe 30 which communicates with the syphon pipe structure. Details of the steam joint 18 and flange arrangement are not shown in detail as these elements are more fully described in Patent No. 2,700,558 and the assignees pending applications 657,680 filed May 7, 1957, now Patent 2,978,815 and 624,531 filed November 27, 1956. A slight distinction is illustrated in FIG. 1 over the above applications in that the spider-journal 22 is constructed whereby the horizontal syphon pipe 26 may extend through the spider and is affixed therein by set screws. The flange 24 cooperates with a groove in conduit 20 to maintain engagement of the conduit with the spider-flange 22 as described in the applications.

The syphon pipe structure within the drum 10 consists of an elbow 32 which is threaded on the end of the syphon pipe portion 26 and into which the vertical syphon pipe 34 is attached and communicates. The syphon pipe 34 is of a length slightly less than the diameter of the drum 10 and is provided at the end thereof with the pick-up shoe 36.

Syphon bracing structure 37 is also affixed to the elbow 32 and projects from the elbow in the opposite direction from that of the pipe 34 and is coaxial with the vertical syphon pipe. It is the function of the bracing structure 37 to firmly position and maintain the syphon shoe in engagement with the drum inner periphery and this is accomplished by the following components. The elbow 32 is provided with an enlarged boss 38 into which a threaded hole is formed to receive the threaded adjusting rod 40. An adjusting nut 42 is threaded upon rod 40 and hence is axially positionable thereon and may be locked in position by a jam nut 44. A tubular sleeve 46 having an inner diameter slightly larger than the adjusting rod 40 telescopingly engages the rod 40 to rest upon the nut 42. A pressure plate 48 having a cylindrical shank 50 extending therefrom is adapted to engage the drum inner periphery and the shank 50 is telescopingly inserted into the upper end of the sleeve 46. A compression spring 52 is inserted over the shank 50 and engages the pressure plate 48 at one end and a washer 54 at the other end which contacts the upper end of the sleeve 46.

It will be therefore apparent that upon the pick-up shoe 36 resting on the inner periphery of the shell 12, rotation of adjusting nut 42 to axially move sleeve 46 toward the pressure plate 48 will compress the spring 52 upon movement of the pressure plate being prevented due to contact with shell 12. Compression of the spring 52 is continued until the desired force holding the pick-up shoe in contact with the shell is achieved. The bracing structure and the syphon pipe 34 together, in effect, form a diameter of the dryer drum and may be placed as desired anywhere between the drum heads 14, although in most installations the pick-up shoe is best located centrally between the heads. As will be observed from FIG. 1 the spider-flange 22 would constitute the only means of supporting the syphon pipe structure within the drum if the bracing structure 37 were not used and with drums of substantial size the horizontal distance from the spider-flange to the syphon shoe is of such length that substantial strain may be imposed on the syphon pipe 26 as the pick-up shoe engages the condensate puddle during starting rotation of the dryer drum. However, by using the plate 48, spring 52 and associated structure the pick-up shoe 36 may be held in firm engagement with the drum shell sufficient to prevent deflection or movement of the vertical pipe 34 or pick-up shoe 36 as the shoe engages the condensate puddle prior to the condensate rimming. Thus, torsional and bending stress on the horizontal pipe 26 is minimized and the probability of fatigue failures significantly reduced.

The syphon pipe assembly may be installed in at least two different procedures. For instance, when the dryer drum has been shut down a sufficient length of time to have cooled and if the drum is provided with a man hole in one of the heads, as represented at 56 in FIG. 1, the pick-up shoe 36, pipe 34, elbow 32 and bracing structure 37 may be pre-assembled and carried into the drum via the man hole. As assembled, the nuts 42 and 44 are positioned on rod 40 such as to be adjacent the elbow boss 38 whereby the combined length of the rod 42, sleeve 46 and shank 50 will be less than the internal diameter of the dryer drum. The horizontal syphon pipe 26 is now inserted through the hollow journal 16 and threaded into the elbow 32; this operation is facilitated by providing the elbow with a conical guide 58 concentric with the horizontal threaded bore in the elbow whereby inserting the end of pipe 26 into the guide will align the pipe threads with those of the elbow. After assembly of pipe 26 to the elbow the spider-flange 22 is inserted over and positioned on the pipe to determine the position of the pick-up shoe within the drum, the spider-flange may now be affixed to the journal 16. At this point the adjusting nut 42 is rotated to move the nut toward sleeve 46 which axially moves the sleeve, raising the pressure plate 48 until it engages the drum shell, further rotation of nut 42 telescopes sleeve 46 over the shank 50 compressing spring 52 and the spring is compressed until an adequate force is produced to hold the pick-up shoe 36 in position under expected stresses. A force of 120 lbs. has proven adequate in most instances. Upon obtaining the desired spring compression the jam nut 44 is tightened against nut 42 to lock the desired adjustment. The joint 18 is then assembled to the spider-flange 22 and the dryer drum is ready for operation.

Some dryer drums, especially the smaller drums, do not have man holes but rather smaller hand holes which permit access of the hands only into the drum interior and with drums of this type or wherein the syphon pipe must be replaced in a drum which has not cooled sufficiently to permit entry by a mechanic a second mode of installation is available. As will be noted in FIG. 2 the sleeve 46 is provided with a diametrical bore 60 and the shank 50 with a diametrical bore 62. These bores are axially positioned such that upon telescoping shank 50 into sleeve 46 to compress spring 52 the bore 62 will align with bore 60 when a pre-determined compression in the spring is achieved and a pin 64 is inserted into the bores upon alignment to prevent axial movement between the sleeve and shank. The nut 42 is then positioned such that the overall length of the pick-up shoe 36, pipe 34, elbow 32 and bracing structure is slightly less than the internal diameter of the dryer drum. The assembled unit is then inserted into the drum via the man or hand hole after a pull wire or cord has attached to the pin 64. The unit may then be diametrically disposed within the drum adjacent the head 14 in which the access opening is provided. The horizontal syphon pipe 26 is then threaded into the elbow 32 and the vertical portion of the syphon assembly may be properly positioned in the drum by axially positioning the pipe 26. Once the spider-flange is affixed to the horizontal pipe the bracing function of spring 52 may be activated by removing the pin 64 by the pull wire which allows the pressure plate to engage the inner shell periphery and maintains the pick-up shoe in position as described above. Thus the syphon assembly may be installed without the mechanic entering the drum.

FIGS. 3 and 4 are detail views of the condensate pick-up shoe preferably employed with the bracing structure of the invention, however, it will be understood that the bracing structure may be effectively employed with other types of pick-up shoes adapted to directly engage the inner drum periphery. As the syphon system removes the condensate during rotation of the drum when the condensate is "rimmed" a film of condensate will surround the shoe and hence the most uniform flow of condensate into the pipe 34 may be achieved by directing the condensate uniformly into the shoe. To this end the pick-up shoe 36 consists of a central circular base 66 from which rises the concentric boss 68 and four equally spaced bosses 70. The central boss 66 is provided with a threaded bore 72 to receive the threaded end of pipe 34 and is formed with a shoulder 74 to limit the pipe penetration into the bore. The underside 76 of the base 66 is conical from a point near the periphery of the base toward the throat 78 which communicates with the bore 72. As will be noted in FIG. 4, the surface of the throat 78 is radiused as at 80 to intersect with the conical surface 76 at a tangent thereby insuring a smooth non-turbulent flow into the pipe 34.

A lower rim 82 is defined on the lower side of the base 66 intersecting the conical underside surface 76. Rim 82 is of cylindrical configuration of a radius substantially equal to, and preferably slightly less than the internal radius of the dryer drum. The bosses 70 are drilled and threaded to receive the threaded legs 84 and a lock nut 86 is threaded on the legs 84 to retain the legs in the adjusted position.

When adjusting the legs 84 it is necessary to position the legs such that each extends the same distance below the rim 82 such that the annular opening 88 between the rim and the shell 12 be uniform throughout the periphery of the shoe. Preferably indicia is provided on the upper side of the base 66 to indicate how the shoe is to be disposed to the drum thereby insuring that the cylindrical form of rim 82 and the form of the dryer shell are concentric and that the opening 88 may be adjusted as desired. The amount of condensate flowing into the pickup shoe is dependent on several factors, the most important being the degree of pressure differential in the syphon assembly and the drum interior and area of the annular opening 88 and the size of the pipes 26 and 34. Thus the legs 84 are adjusted in accordance with the differential pressure and size of pipe to provide an area opening which will maintain a minimum condensate thickness yet regulates the flow such that "flashing" and turbulence are minimized. The conical underside 76 is such to maintain the condensate flow at a substantially uniform velocity as the liquid approaches the throat 78 and as the radius 80 is tangent to the inner diameter of pipe 34 as well as surface 76 the possibility of turbulence and attendant voids which cause "flashing" are reduced.

I claim:

1. In a condensate removal structure for use with a rotatable steam heated dryer drum having a hollow journal and a peripheral shell comprising a first conduit extending into the interior of the drum through the hollow journal, an elbow within the drum affixed to the end of said first conduit, a second conduit affixed to said elbow in communication with said first conduit, a condensate pickup fitting affixed to said second conduit and engaging the inner surface of the drum shell, a pressure plate engageable with the inner drum surface and supported by said elbow on the opposite side thereof with respect to said second conduit, whereby said fitting and plate engage the drum in opposed diametrical relation, telescoping structure interposed between said elbow and plate supporting said plate upon said elbow for selective radial movement relative thereto, a spring biasing said plate away from said elbow and releasable locking means maintaining said spring in a compressed condition greater than that of normal operating compression, whereby said plate and fitting may be maintained at a separated distance less than the inside diameter of the drum to facilitate assembly with the drum, and upon release of said locking means said spring will hold said plate and fitting in contact with the drum inner surface.

2. In a condensate removal structure as in claim 1, wherein a threaded opening is defined in said elbow to receive said first conduit, a conical guide surface defined on said elbow converging toward and concentric to said opening, whereby said surface guides the first conduit into said opening during the assembly of said elbow and first conduit.

3. Condensate removal structure as in claim 1 wherein said telescoping structure comprises a threaded adjusting rod affixed to said elbow, a tubular sleeve telescopingly mounted at one end on said rod, a nut threaded on said rod engaging said end of said sleeve for axially positioning said sleeve on said rod, a shank telescoping into the other end of said sleeve, said pressure plate being affixed to said shank and said spring being interposed between said plate and the adjacent end of said sleeve.

4. In a condensate removal structure as in claim 3, wherein said releasable locking means comprises a diametrical hole defined in said sleeve, a diametrical hole defined in said shank, and a removable pin inserted through said holes upon alignment thereof.

5. In a condensate removal structure for use with a rotatable dryer drum having a peripheral shell having outer and inner cylindrical surfaces and including conduit means extending into the interior of the drum, a condensate pickup shoe affixed to the end of said conduit means in communication therewith, said pickup shoe comprising a base member having a centrally disposed portion, a bore within said portion receiving said conduit means, a shell facing surface defined on said base member, said shell facing surface comprising a conical surface converging toward and communicating with said bore, a rim defined on said shell facing surface constituting the outer periphery thereof, said rim lying in a cylindrical surface concentric to said shell inner surface of a radius substantially equal to that of the shell inner surface, locating means locating said rim in adjacent spaced relation to the inner shell surface, whereby said rim and inner shell surface define a continuous peripheral access toward the shell facing surface of said base, whereby said access will be of substantially equal dimension through its periphery and means maintaining said pickup shoe locating means in engagement with the inner shell surface.

6. In a condensate removal structure as in claim 5, wherein said locating means locating said shoe in spaced relation to the inner drum surface comprise legs threaded into said shoe and extending below said shell facing surface engaging the drum inner surface.

7. In a rotatable condensate removal structure for use with a rotatable dryer drum having a peripheral shell having an inner cylindrical surface and including conduit means extending into the interior of the drum and rotating therewith, a condensate pickup shoe affixed to the end of said conduit means in communication therewith, said pickup shoe comprising a body having a centrally disposed portion, a bore within said portion receiving said conduit means and coaxial therewith and communicating with a shell facing surface defined on said body, a rim defined on said body defining the periphery of said surface, said rim being circular and coaxial with respect to the axis of said central portion and the conduit received therein and lying in a cylindrical surface concentric to said inner cylindrical shell surface and having a radius substantially equal to that of said inner cylindrical shell surface, locating means mounted on said body locating said rim in predetermined adjacent spaced relation to said inner cylindrical shell surface and means maintaining said pickup shoe locating means in engagement with said inner shell surface.

8. In a rotatable condensate removal structure as in claim 7 wherein said shell facing surface is conical in configuration converging from said rim toward said bore.

9. In a rotatable condensate removal structure as in claim 7 wherein said locating means locating said rim in spaced relation to said inner cylindrical shell surface comprises threaded legs operatively associated with threaded holes defined in said body and engaging the shell inner surface.

References Cited in the file of this patent

UNITED STATES PATENTS

| | | |
|---|---|---|
| 267,666 | Brigham | Nov. 21, 1882 |
| 1,981,938 | Anderson | Nov. 27, 1934 |
| 2,297,094 | Armstrong | Sept. 29, 1942 |
| 2,485,689 | Bauman | Oct. 25, 1949 |
| 2,591,531 | Fishback | Apr. 1, 1952 |